United States Patent [19]
Muto

[11] Patent Number: 5,065,411
[45] Date of Patent: Nov. 12, 1991

[54] DIVERSITY RECEIVING SYSTEM FOR USE IN DIGITAL RADIO COMMUNICATION WITH MEANS FOR SELECTING BRANCH BY ESTIMATING PROPAGATION PATH PROPERTY

[75] Inventor: Hiroyasu Muto, Tokyo, Japan
[73] Assignee: NEC Corporation, Tokyo, Japan
[21] Appl. No.: 553,287
[22] Filed: Jul. 17, 1990

[30] Foreign Application Priority Data
Jul. 17, 1989 [JP] Japan .................................. 1-185427

[51] Int. Cl.⁵ .......................... H04B 7/10; H04L 1/02
[52] U.S. Cl. ...................................... 375/100; 375/14; 455/133
[58] Field of Search ...................... 375/38, 40, 14, 100, 375/102; 455/133, 132, 137, 296; 371/43, 44, 45

[56] References Cited
U.S. PATENT DOCUMENTS

| | | | |
|---|---|---|---|
| 4,384,358 | 5/1983 | Shiki et al. | 375/100 |
| 4,672,629 | 6/1987 | Beier | 375/100 |
| 4,733,402 | 3/1988 | Monsen | 375/14 |
| 4,748,682 | 5/1988 | Fukar et al. | 455/137 |
| 4,850,037 | 7/1989 | Bochmann | 375/100 |
| 4,884,272 | 11/1989 | McConnell | 371/43 |
| 4,926,498 | 5/1990 | Suzuki et al. | 455/133 |
| 4,935,940 | 6/1990 | Reindl | 375/100 |

Primary Examiner—Stephen Chin
Attorney, Agent, or Firm—Sughrue, Mion, Zinn, Macpeak & Seas

[57] ABSTRACT

A diversity system comprising two receiving branches for receiving a radio signal including a data signal portion and a training signal portion propagating through a multipath, wherein, in each branch, a transmission property of a propagating path thereto is estimated from the training signal portion received, the transmission property comprising components significant to an equalizer and the remaining insignificant components, a blanch selectors selects, as a selected branch, a specific one of the branches providing the maximum value of a power ratio of the significant components to the insignificant components, and the equalizer equalizes the data signal portion received at the selected branch to produce an equalized signal as a resultant signal of the system. In order to reduce effect to the property estimation from the data signal portion, the branch selector selects, as the selected branches, a particular one of the branches providing the maximum value of a power sum of the significant components and the insignificant components, when another ratio of the power of the significant components and the power some is larger than a predetermined value.

9 Claims, 7 Drawing Sheets

DIVERSITY RECEIVING SYSTEM FOR USE IN DIGITAL RADIO COMMUNICATION WITH MEANS FOR SELECTING BRANCH BY ESTIMATING PROPAGATION PATH PROPERTY

BACKGROUND OF THE INVENTION

The present invention relates to a diversity receiving system for use in reception of a radio signal transmitted from a transmitter in a digital radio communication, and, in particular, to such a diversity system which enables to select a proper branch by estimating propagation path property by use of a training signal so as to reduce intersymbol interference caused by multipath selective fading.

In a communication system, especially, a mobile communication system, an input signal level for a receiver varies intensely by variation in a propagation path and/or a transmission medium of a radio signal. This phenomenon is known as a fading.

In order to avoid a bad effect from the fading, a diversity receiving system of various types is also known in the prior art. The diversity receiving system usually comprises a plurality of receiving branches which produces branch outputs, respectively. A resultant output of the diversity receiving system is obtained as a composite signal of the branch outputs or as one selected from the branch outputs.

When a transmitter transmits a transmission signal as the radio signal, a part of the radio signal directly propagates to a receiver. However, a remaining part is reflected and scattered by various bodies such as buildings, mountains and the like and therefore, reaches to a receiving system with a delay.

Accordingly, the input signal received at the receiving system comprises the direct signal component and the delay component and suffers from distortion. The propagation path causing such a distortion is known as a multipath and the distortion is referred to as a multipath distortion.

In one method for reducing the multipath distortion, the radio signal transmitted from the transmitter comprises a training signal and a data signal. The receiving system estimates the transmission property of the multipath by use of the training signal and equalizes the received signal by the estimated signal to reduce the multipath distortion.

When the diversity receiving system is used for the multipath, the multipath distortion is different at receiving branches. Therefore, when the branch output selection is carried out by, for example, the input signal intensity for each branch, the resultant signal from the diversity receiving system is affected by a different transmission property of the multipath.

A diversity receiving system for effectively reducing the multipath distortion is disclosed in a Japanese Patent Application No. 113202/1989 filed on May 2, 1989 by the same assignee (NEC Corporation). The corresponding U.S. patent application was filed by the applicant, Kazuhiro Okanoue, on May 2, 1990 whose serial number is Ser. No. 07/517,883 and assignee is the same as the present application. The disclosed diversity receiving system uses the training signal in the transmission signal and an equalizer for equalizing the resultant signal. In the proposed diversity receiving system, a propagation property is estimated at each receiving branch by use of the training signal received thereat. The estimated propagation path property is classified into components significant and insignificant for the equalizer. A ratio of a power of the insignificant components and another power of the insignificant components are calculated. The ratio in each branch is used as a parameter for selecting one of the branches. That is, the ratios from all of the receiving branches are compared with one another and one of the branches providing the largest one of the all ratios is selected as a specific branch. Then, the branch output from the specific branch is selected as the resultant signal of the diversity system and is equalized by the propagation path property estimated in the specific branch. Therefore, equalization is effectively carried out and the receiving performance is improved by the diversity effect.

However, when the training signal has a predetermined bit length, for example, 26-bit length, the data signal affects estimation of the propagation path property using the training signal, so that an error is included in the calculated ratio, especially, the power of the insignificant components. This results in degradation of S/N ratio in branch selection. The degradation of S/N ratio is considerably observed when the intersymbol interference is caused within an equalizing performance of the equalizer.

SUMMARY OF THE INVENTION

Accordingly, it is an object of the invention to provide a diversity receiving system which enables the branch selection without the degradation of S/N ratio.

It is another object of the present invention to provide a diversity receiving system which enables branch selection by different parameters dependent on intersymbol interference due to a multipath with reference to an equalizing performance of an equalizer to effectively reduce the intersymbol interference.

According to the present invention, a diversity receiving system is obtained which is for use in reception of a radio signal transmitted through a multipath from a transmitter in digital radio communication system, the radio signal carrying a data signal and a training signal. The diversity receiving system comprises: equalizing means for equalizing an input signal to produce an equalized signal; a plurality of receiving branches, each of the receiving branches comprising: receiving means for receiving an incoming signal representative of the radio signal to produce a digital reception signal, the digital reception signal comprising a reception data signal and a reception training signal representative of the data signal and the training signal, respectively; holding means coupled to the receiving means for holding the digital reception signal; estimating means coupled to the holding means for estimating a transmission property of the multipath from the reception training signal to produce an estimated transmission property; and classifying means coupled to the estimating means for classifying the estimated transmission property into components significant to the equalizing means as significant components and the remaining components as insignificant components; branch selecting means coupled to the classifying means in each of the receiving branches for calculating a first and a second power ($\alpha$ and $\beta$) of the significant components and the insignificant components, a first ratio ($\alpha/\beta$) of the first and the second powers, a sum ($\alpha+\beta$) of the first and the second powers, and a second ratio ($\alpha/(\alpha+\beta)$) of the first power and the sum for each of the receiving branches, the branch selecting means selecting one of the receiving branches as a selected branch in response to the first ratio, the second ratio, and the sum in connection with each of the receiving branches, the branch selecting means producing a selection signal representative of the selected branch; first switch means coupled to the holding means in each of the receiving branch, the equalizing means, and the branch selecting means responsive to the selection signal for switching to connect the holding means in the selected branch as a selected holding means with the equalizing means to deliver the reception data signal in the selected holding means to the equalizing means as the input signal; and second switch means coupled to the classifying means in each of the receiving branch, the equalizing means, and the branch selecting means responsive to the selection signal for switching to connect the classifying means in the selected branch as a selected classifying means with the equalizing means to deliver the significant components in the selected classifying means to the equalizing means, the equalizing means equalizing the input signal by the significant components to produce the equalized signal as a resultant signal of the diversity receiving system.

The branch selecting means compares the second ratio for each of the receiving branches with a preset reference value, and compares the first ratio for each of the receiving branches with each other when the second ratio for each of the receiving branches is smaller than the reference value. The branch selecting means selects, as the selected branch, a specific one of the receiving branches which provides the largest one of the first ratio for each of the receiving branches.

The branch selecting means compares the sum for each of the receiving branches with each other when the first ratio for any one of the receiving branches. The branch selecting means selects, as the selected branch, a particular one of the receiving branches which provides the largest one of the sum for each of the receiving branches.

DESCRIPTION OF PREFERRED EMBODIMENTS

Figure 1:
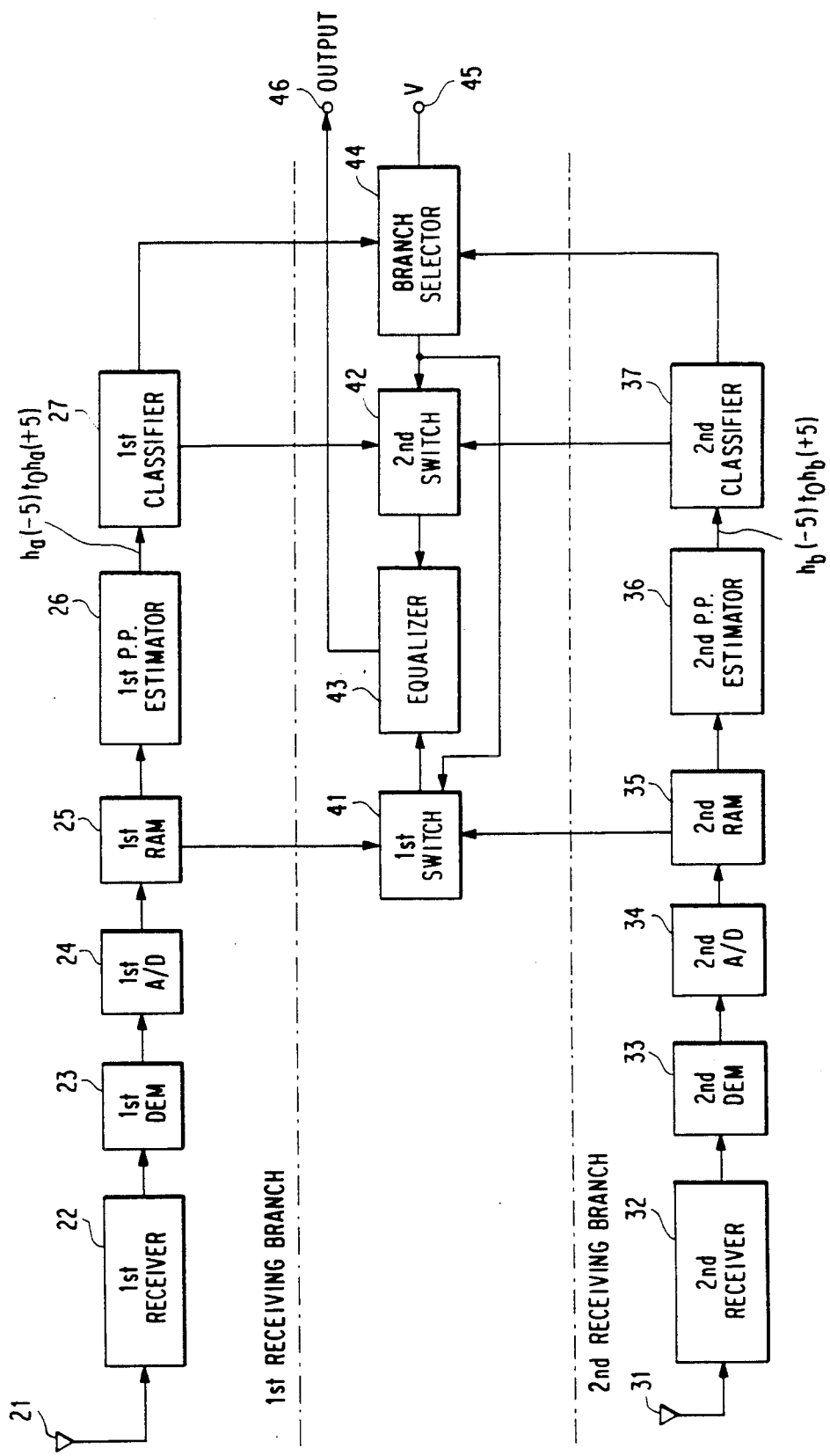
FIG. 1 is a block diagram view of a diversity receiving system according to one embodiment of the present invention.

Referring to FIG. 1, a diversity receiving system according to the embodiment comprises a plurality of receiving branches (two branches are shown).

A first receiving branch comprises a first receiving antenna 21, a first receiver 22 coupled to the first receiving antenna 21, a first demodulator (DEM) 23 coupled to the first receiver 22, a first analog/digital convertor (A/D) 24 coupled to the first demodulator 23, a first random access memory (RAM) 25 coupled to the first analog/digital convertor 24, a first propagation path property (P.P.) estimator 26 coupled to the first RAM 25, and a first classifier 27 coupled to the first propagation path property estimator 26.

On the other hand, a second receiving branch also comprises a second receiving antenna 31, a second receiver 32 coupled to the second receiving antenna 31, a second demodulator (DEM) 33 coupled to the second receiver 32, a second analog/digital convertor (A/D) 34 coupled to the second demodulator 33, a second random access memory (RAM) 35 coupled to the first analog/digital convertor 34, a second propagation path property (P.P.) estimator 36 coupled to the second RAM 35, and a second classifier 37 coupled to the second propagation path property estimator 36.

The shown diversity receiving system further comprises a processing system for selecting one of the first and second receiving branches to equalize a demodulated signal from the selected receiving branch. The processing system comprises a first switch 41 coupled to the first and the second RAMs 25 and 35, a second switch 42 coupled to the first and the second classifiers 27 and 37, an equalizer 43 connected to the first and the second switches 41 and 42, and a branch selector 44 coupled to the first and the second classifiers 27 and 37. The branch selector 44 is provided with a terminal 45 for receiving a threshold or a reference value V which will later be described.

It is provided that the binary-phase-shift-keying (BPSK) is used as a modulation in a transmitter. A digital signal having a symbol rate comprises a data signal portion and a training signal portion. The transmitter transmits the digital signal as a transmission signal. The transmission signal from a transmitter (not shown) propagates to the first and the second receiving antennas 21 and 31 through a multipath.

A signal incoming through each of the first and the second antennas 21 and 31 is received at each of the first and the second receivers 22 and 32 and is thereafter demodulated at each of the first and the second demodulators 23 and 33. The demodulated signal is converted into a converted digital signal with a sampling rate equal to the symbol rate at each of the first and the second analog/digital convertors 24 and 34.

Each of the first and the second receivers 22 and 32, each of the first and the second demodulators 23 and 33, and each of the first and the second analog/digital convertors 24 and 34 operate as a receiving means for processing the incoming signal to produce the converted digital signal as a digital reception signal.

Figure 2:
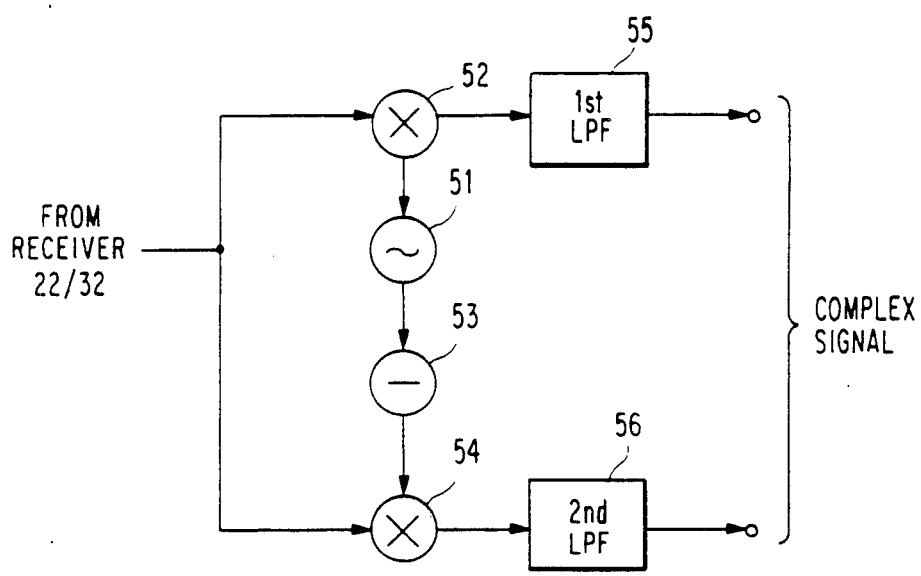
FIG. 2 is a block diagram view illustrating a demodulator used in FIG. 1.

Referring to FIG. 2, each of the first and the second demodulators 23 and 24 comprises an oscillator 51 for oscillating a local signal, a first mixer 52 for frequency mixing the local signal and a reception signal from each of the first and the second receivers 23 and 33 to produce a first mixed signal, a phase shifter 53 for phase-shifting the local signal by $\pi/2$ to produce a phase shifted signal, a second mixer 54 for frequency mixing the reception signal and the phase-shifted signal to produce a second mixed signal, and a first and a second lowpass filter (LPF) 55 and 56 for filtering the first and the second mixed signals to produce a complex signal as a demodulated signal.

Returning to FIG. 1, the converted digital signal from each of the first and the second analog/digital convertors 24 and 34 is stored or held in each of the first and the second RAMs 25 and 35 which operates as a holding means. The converted digital signal comprises the data signal portion and the training signal portion. Each of the first and the second propagation path property estimators 26 and 36 estimates a transmission property of the propagation path from the transmitter to each of the first and the second receiving antennas 21 and 31 by use of the training signal portion in the converted digital signal stored in each of the first and the second RAMs 25 and 35.

Figure 3:
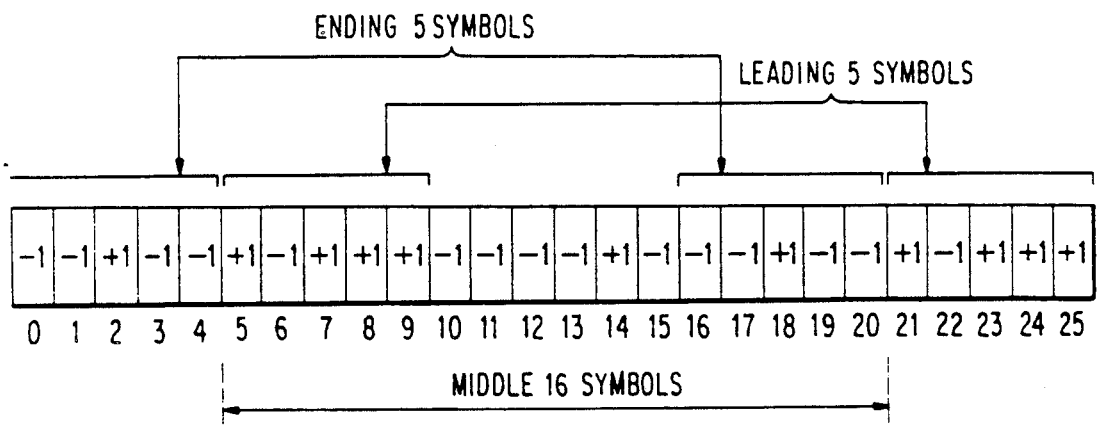
FIG. 3 is a view illustrating an example of a training signal.
Figure 4:
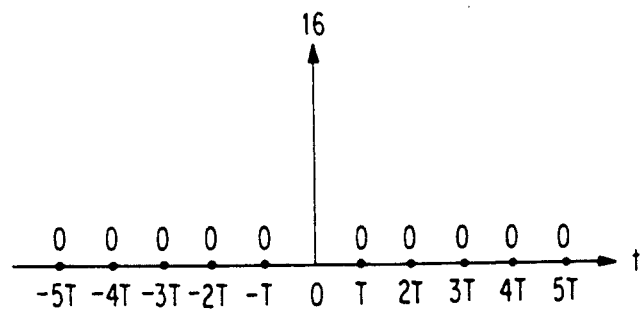
FIG. 4 is a view illustrating a correlation function between the training signal and a reference signal which is a middle 16-bit portion of the training signal.

Referring to FIG. 3, the training signal comprises leading five symbols, ending five symbols and middle sixteen symbols (twenty-six (26) symbols in total) in the present embodiment. An autocorrelation function between the training signal of twenty-six symbols and the middle sixteen symbols is represented by an impulse over a range of $-5T$ to $+5T$ (T is a time duration of a single symbol) as shown in FIG. 4. It is possible by use of the training signal of which the autocorrelation function is represented by the impulse to estimate the property of the propagation path.

Figure 5:
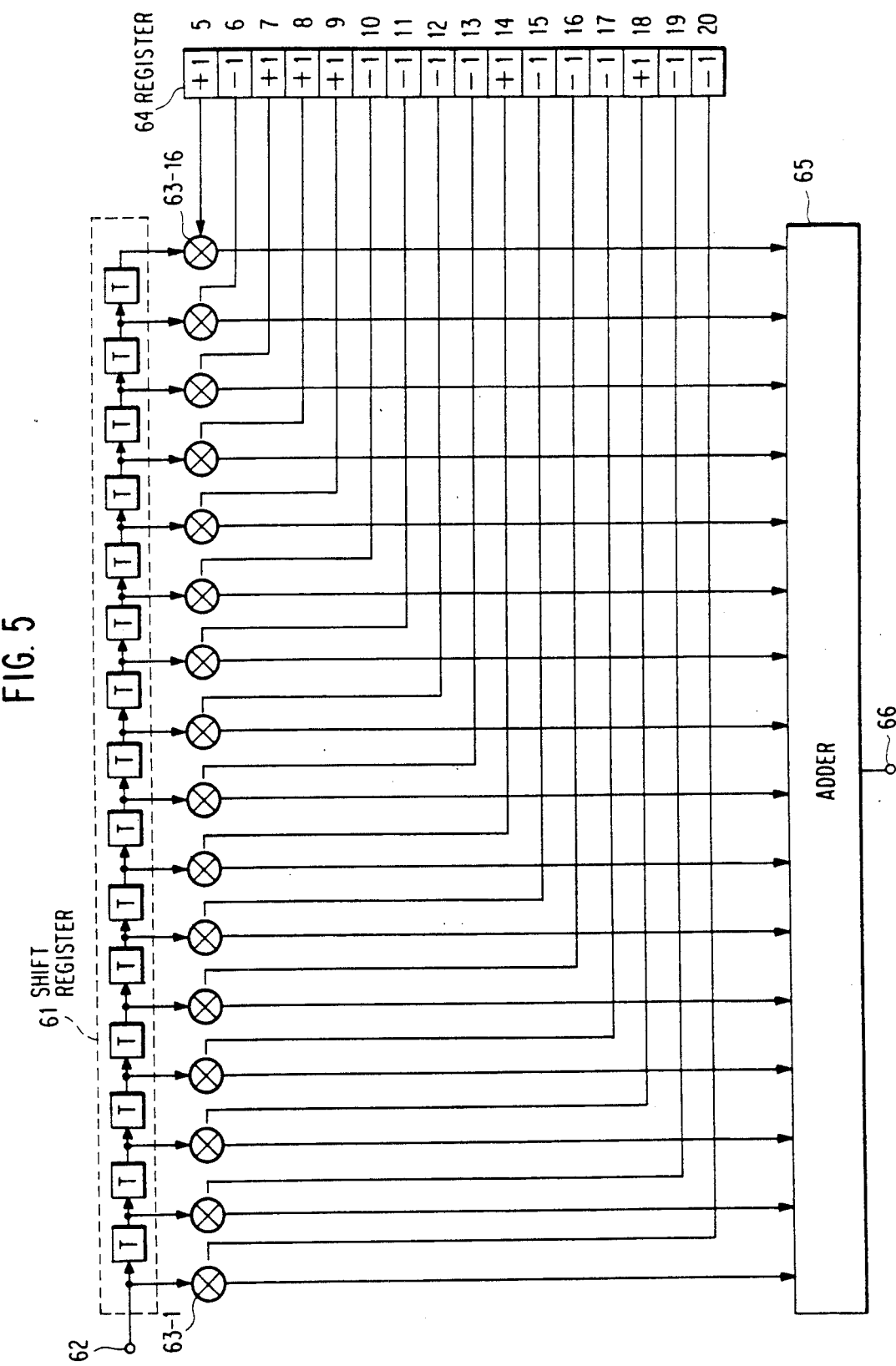
FIG. 5 is a block diagram view illustrating a propagation path property estimator used in FIG. 1.

Referring to FIG. 5, each of the first and the second propagation path property estimators 26 and 36 comprises a sixteen-stage shift register 61 which comprises 15 delay elements (T) cascaded, an input terminal 62 coupled to each of the first and the second RAMs 25 and 35, respectively and sixteen taps connected to sixteen multipliers 63-1 through 63-16, respectively. The training signal portion is time-serially applied from each of the first and the second RAMs 25 and 35 to the input terminal 62. A register 64 of sixteen stages is preset with the middle sixteen (16) symbols of the training signal portion from each of the first and the second RAMs 25 and 35. The middle sixteen (16) symbols are supplied from the register 64 to the sixteen multipliers 63-1 through 63-16 as reference signals, respectively, so that a signal on each of the sixteen taps of the shift register 61 is multiplied by each of the reference signals from the register 64 at each of the multipliers 63-1 through 63-16 to produce a multiplied signal. An adder 65 adds sixteen multiplied signals from the sixteen multipliers 63-1 through 63-16 one another to produce an added signal as a crosscorrelation function value at an output terminal 66 coupled to each of the first and the second classifiers 27 and 37. Each of the first and the second estimator 26 and 36 carries out an estimation operation from a time instant when the leading or start symbol (0-th bit in FIG. 3) in the training signal portion is delivered from the 16th (or the end stage) tap to the 16th multiplier 63-16 to another time instant when the ending symbol (25th bit in FIG. 3) is delivered from the first (or the first stage) tap to the first multiplier 63-1. Thus, eleven crosscorrelation function values are obtained at the output terminal 66 by one estimation operation for one training signal. These eleven values are considered as estimated impulse responses or property of the propagation path over a time duration from $-5T$ to $+5T$ and are now represented by $h(-5)$ through $h(+5)$.

In order to distinguish the estimated impulse responses obtained at the first propagation path property estimator 26 from the estimated impulse response obtained at the second propagation path property estimator 36, the former is represented by $h_a(-5)$ through $h_a(+5)$ and the latter is represented by $h_b(-5)$ through $h_b(+5)$.

Returning to FIG. 1, each of the first and the second classifiers 27 and 37 classifies the estimated impulse responses from each of the first and the second propagation path property estimators 26 and 36 into two groups, one of the two groups being significant components to the equalizer 43 and the other being insignificant components to the equalizer 43. Each of the first and the second classifiers 27 and 37 supplies the significant components to the second switch 42 and supplies the significant and the insignificant components to the branch selector 44.

Providing that the equalizer 43 can equalize intersymbol interferences within a 5T time duration caused by the propagation path, the equalizer 43 can equalize five of the estimated impulse responses $h(-5)$ through $h(+5)$ which are significant components. The significant components are represented by $h(j)$ through $h(j+4)$ which meet or satisfy the following equation:

$$\sum_{k=0}^{4} |h(j + k)|^2 = \max\left(\sum_{k=0}^{4} |h(i + k)|^2\right) \quad (1)$$

$$(i = -5, -4, \ldots, 0, 1)$$

The insignificant components are $h(i)$ except $h(j)$ through $h(j+4)$ and are residual intersymbol interference components which can not be equalized by the equalizer 43.

Therefore, the first classifier 27 selects from $h_a(-5)$ through $h_a(+5)$ first significant components $h_a(j)$ through $h_a(j+4)$ and delivers the first significant components to the second switch 42 and delivers the first significant components and the remaining or first insignificant components to the branch selector 44. Similarly, the second classifier 37 selects from $h_b(-5)$ through $h_b(+5)$ second significant components $h_b(j)$ through $h_b(j+4)$ and delivers the second significant components to the second switch 42 and delivers the second significant components and the remaining or second insignificant components to the branch selector 44.

The branch selector 44 receives the significant components and the insignificant components from each of the first and the second classifiers 27 and 37 and calculates a power $\alpha$ of the significant components and a power $\beta$ of the insignificant components. In this connection, the significant components are respectively squared and then added to produce the power $\alpha$. That is, $\alpha$ is represented by:

$$\alpha = \sum_{k=0}^{4} |h(j + k)|^2.$$

The power $\beta$ is obtained by squaring the insignificant components and then summing them.

The branch selector 44 further calculates a first and a second ratio S $(=\alpha/\beta)$ and U $(=\alpha/(\alpha+\beta))$ and a sum P $(=\alpha+\beta)$ of the significant component power $\alpha$ and the insignificant component power $\beta$.

When the intersymbol interference is within a range which the equalizer 43 can equalize, the insignificant component power $\beta$ comprises error components and noise components and has a small value so that the second ratio U is nearly equal to 1. On the other hand, when the intersymbol interference is caused over a wide range which the equalizer 43 cannot equalize, the insignificant component power $\beta$ comprises the residual intersymbol interference components as well as the error components and the noise components so that the second ratio U has a relatively small value.

Now, the significant component power $\alpha$, the insignificant componet power $\beta$, the first ratio S, the second ratio U, and the sum P calculated from the first significant components and the first insignificant components from the first classifier 27 to the branch selector 44 are represented by $\alpha_a$, $\beta_a$, $S_a$, $U_a$, and $P_a$, respectively. Those calçulated from the second significant components and the second insignificant components from the second classifier 37 to the branch selector 44 are represented by $\alpha_b$, $\beta_b$, $S_b$, $U_b$, and $P_b$, respectiveley.

The branch selector 44 is supplied with the threshold value V as a reference signal for the second ratio U through the terminal 45. The branch selector 44 compares the threshold value V with the second ratios $U_a$ and $U_b$. When any one of $U_a$ and $U_b$ is not larger than the threshold value V, the first ratios $S_a$ and $S_b$ are selected as parameters for selecting one of the first and the second receiving branches.

Then, the branch selector 44 compares $S_a$ and $S_b$ and produces a selection signal for selecting a specific one of the first and the second receiving branches when the specific receiving branch provides a larger one of $S_a$ and $S_b$. The selection signal is applied to the first and the secqnd switches 41 and 42. Then, the first and second switches 41 and 42 operate to connect a specific RAM and a specific classifier in the specific receiving branch to the equalizer 43. Providing $S_a > S_b$, the first receiving branch is the specific receiving branch and the first RAM 25 and the first classifier 27 are the specific RAM and the specific classifier. Then, the equalizer 43 receives the data signal from the first RAM 25 as an input data signal and equalizes the input data signal by use of the first significant components from the first classifier 27. On the other hand, when $S_b < S_a$, the equalizer 43 receives the data signal from the second RAM 35 as an input data signal and equalizes the input data signal by use of the second significant components from the second classifier 37.

When at least one of $U_a$ and $U_b$ is larger than the threshold value V, the powers $P_a$ and $P_b$ are selected as parameters for selecting one of the first and the second receiving branches. When the branch selector 44 compares $P_a$ and $P_b$ and produces the selection signal for selecting one of the first and the second receiving branches as a specific receiving branch. One of the first and the second receiving branches which provides a larger one of $P_a$ and $P_b$ is selected as the specific receiving branch.

A maximum likelihood sequence estimator using the Viterbi algorithm can be used as the equalizer 43.

Figure 6:
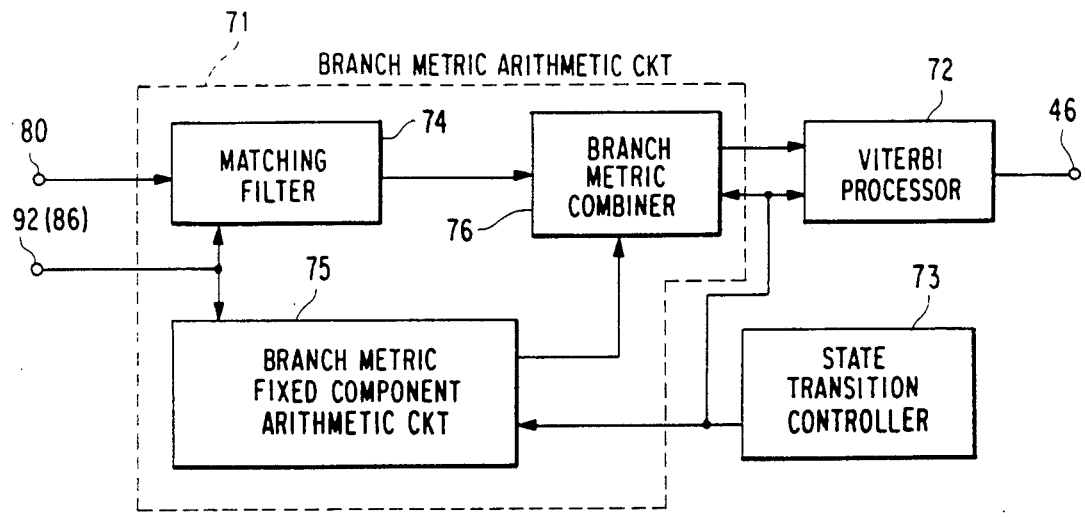
FIG. 6 is a block diagram view illustrating an equalizer used in FIG. 1.

Referring to FIG. 6, the equalizer shown therein comprises a branch metric arithmetic circuit 71 coupled to the first and the second switches 41 and 42 through terminals 80 and 92(86), respectively, a Viterbi processor 72 coupled to the branch metric arithmetic circuit 71, and a state transition controller 73 coupled to the branch metric arithmetic circuit 71 and the Viterbi processor 72.

Figure 7:
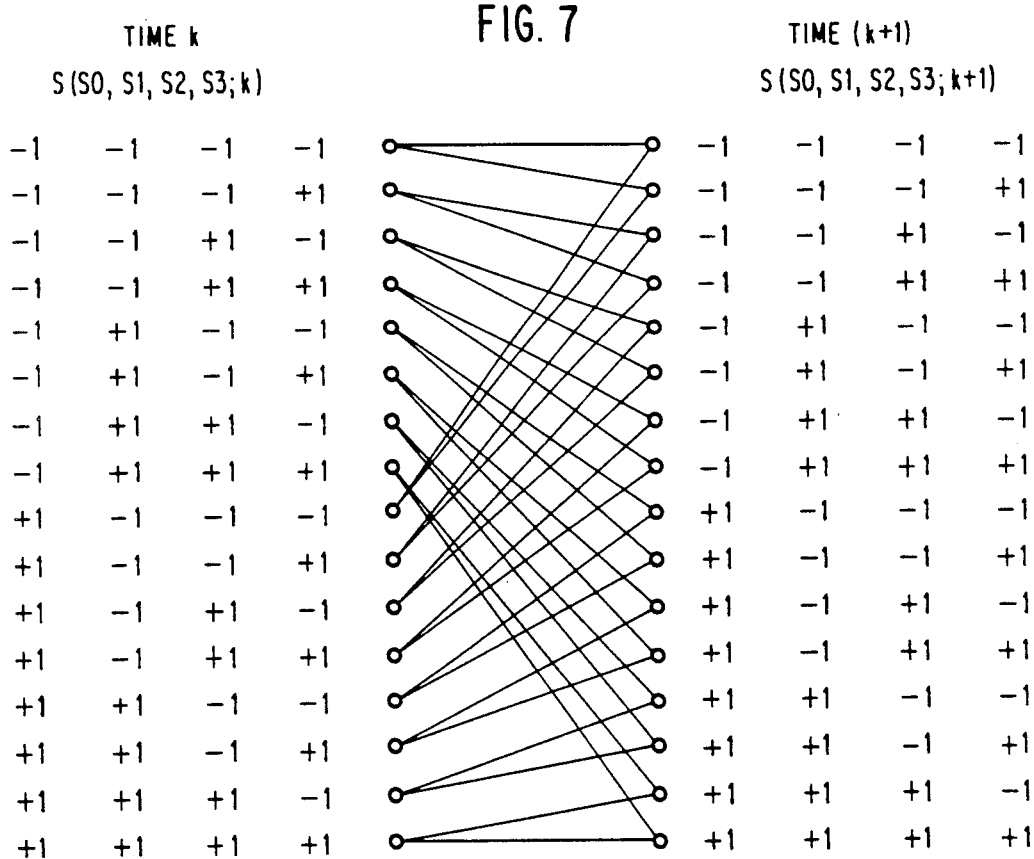
FIG. 7 is a view illustrating a Trellis diagram of a Viterbi processor used in FIG. 6.

Referring to FIG. 7, a Trellis diagram of the Viterbi processor 72 is described in connection with equallization of intersymbol interference over a time duration of 5T caused by the impulse responses of the propagation path. A state S at a time k is defined by a series of all transmitted symbols S0, S1, S2, and S3 interfering the k-th symbol an is represented by S(S0, S1, S2, S3; k). Accordingly, a state transition from a time k to another time (k+1) is defined by a series of five transmitted symbols T0, T1, T2, T3, and T4. In the five symbols, T0, T1, T2, and T3 are S0, S1, S2, and S3 at a time k, while T1, T2, T3, and T4 are S0, S1, S2, and S3 at a time (k+1). For example, a state transition from S(S0, S1, S2, S3; k)=(+1, +1, −1, −1) to S(S0, S1, S2, S3; k+1)=(+1, −1, −1, +1) is given by (T0, T1, T2, T3, T4)=(+1, +1, −1, −1, +1).

Generally speaking, the Viterbi processor is one for carrying out demodulation according to a branch metric corresponding to all of possible state transitions from a time k to another time (k+1), as described in detail in a paper by J. F. Hayes, entitled "The Viterbi algorithm Applied To Digital Data Transmission" IEEE Communication Society, 1975, No. 13.

In the equalizer shown in FIG. 6, the branch metric corresponding to the all possible state transitions can be obtained in the following manner. The state transition controller 73 sequentially produces all possible state transitions (T0, T1, T2, T3, T4) and makes the branch metric arithmetic circuit 71 and the Viterbi processor 72 calculate the branch metric for a desired state transition from the data signal supplied from a selected one of the first and the second RAMs 25 and 35 through the first switch 41 and the significant components supplied from a selected one of the first and the second classifiers 27 and 37 through the second switch 42. For example, when a series of symbols (+1, +1, −1, −1, +1) is produced as the state transition (T0, T1, T2, T3, T4), this means calculation of the branch metric for a state transition from S(S0, S1, S2, S3; k)=(+1, +1, −1, −1) to S(S0, S1, S2, S3; k+1)=(+1, −1, −1, +1).

The branch metric arithmetic circuit 71 comprises a matched filter 74, coupled to the first and the second switches 41 and 42 through terminals 80 and 86, a branch metric fixed component arithmetic circuit 75 coupled to the second switch 42 through the terminal 92 and to the state transition controller 73, and a branch metric combiner 76 coupled to the watched filter 74, the branch metric fixed component arithmetic circuit 75, and the state transition controller 73.

The branch metric fixed component arithmetic circuit 75 and the branch metric combiner 76 calculate the branch metrics corresponding to the state transition of (T0, T1, T2, T3, T4) supplied from the state transition controller 73. The calculated branch metric is supplied to the Viterbi processor 72. The Viterbi processor 72 is also supplied with the state transition (T0, T1, T2, T3, T4) from the state transition controller 73 and processes the branch metrics from the branch metric combiner 76 according to the Viterbi algorithm. The operation is repeated for sequential state transitions and the processed results are obtained from the terminal 46 as the equalized signal.

Figure 8:
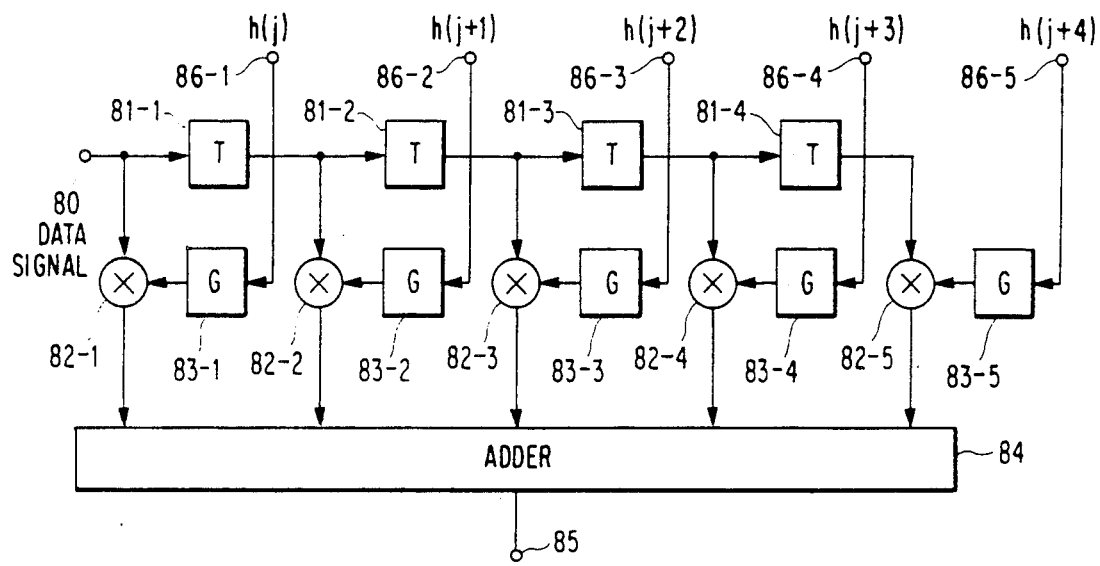
FIG. 8 is a block diagram view of a matching filter used in FIG. 6.

Referring to FIG. 8, an example of the matched filter 74 is a transversal filter. The transvesal filter 74 comprises four delay circuit (T) 81-1 through 81-4 cascaded to each other, five multipliers 82-1 through 82-5, five tap gains 83-1 through 83-5 and an adder 84, as known in the art. The data signal is applied to the cascaded delay elements through an input terminal 80 and five significant components h(j) through h(j+4) are applied to the tap gains (G) 83-1 through 83-5 through tap gain terminals 86-1 through 86-5, respectively. The tap gains (G) obtain from the significant components h(j) through h(j+4) conjugate complex components h(j)* through h(j+4)* which are time-inverted. The time inverted conjugate components are applied to the multipliers 82-1 through 82-5 and are multiplied by the digital data signal to produce multiplied signals. The multiplied signals are added at the adder 84 and the added signal $$z(k) = \sum_{i=0}^{4} h^*(j+i)T_{k+1}$$

is delivered to the branch metric combiner 76 through an output terminal 85.

Figure 9:
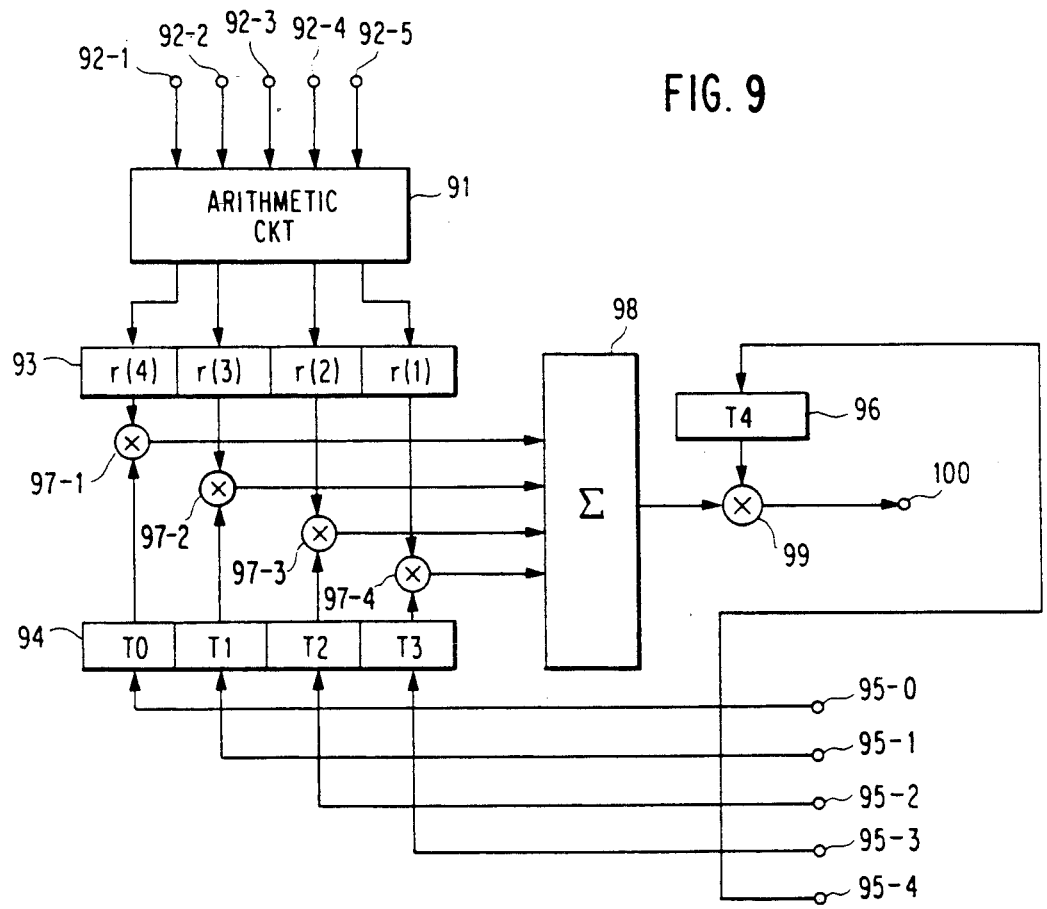
FIG. 9 is a block diagram view illustrating a branch metric fixed component arithmetic circuit used in FIG. 6.

Referring to FIG. 9, an example of the branch metric fixed component arithmetic circuit 75 comprises an arithmetic circuit 91 coupled to the second switch 42 through the terminal 92 for calculating real components r(1) through r(4) from the significant components h(j) through h(j+4) and their conjugate complex components h(j+1)* through h(j+4)* according to the following equation (2):

$$\begin{bmatrix} r(1) \\ r(2) \\ r(3) \\ r(4) \end{bmatrix} = \text{Real} \left\{ \begin{bmatrix} h(j), h(j+1), h(j+2), h(j+3) \\ 0, h(j), h(j+1), h(j+2) \\ 0, 0, h(j), h(j+1) \\ 0, 0, 0, h(j) \end{bmatrix} \begin{bmatrix} h(j+1)^* \\ h(j+2)^* \\ h(j+3)^* \\ h(j+4)^* \end{bmatrix} \right\} \quad (2)$$

The significant components h(j) through h(j+4) are applied to the arithmetic circuit 91 through five terminals 92-1 through 92-5. The calculated real components r(1) through r(4) are temporarily held at a register 93. Another register 94 is supplied with the series of symbols T0, T1, T2, and T3 from the state transition controller 73 through terminals 95-0 through 95-3. Another register 96 is supplied with a symbol T4 from the state transition controller 73 through a terminal 95-4. The real components r(1) through r(4) in the register 93 and the symbols T3 through T0 in the register 94 are multiplied at multipliers 97-1 through 97-4, respectively. The multiplied signals are summed at an adder 98 and the resultant sum is multiplied by T4 in the register 96 at a multiplier 99. A resultant signal is applied to the branch metric combiner 76 through a terminal 100 as a branch metric fixed component. Namely, the following equation (3) is carried out by the multipliers 97-1 through 97-4, the adder 98 and the multiplier 99:

$$b(T0, T1, T2, T3, T4) = \left( \sum_{k=0}^{3} r(4-k) \cdot Tk \right) \cdot T4. \quad (3)$$

Thus, the branch metric fixed component b(T0, T1, T2, T3, T4) is obtained. Where Tk is +1 or −1.

Figure 10:
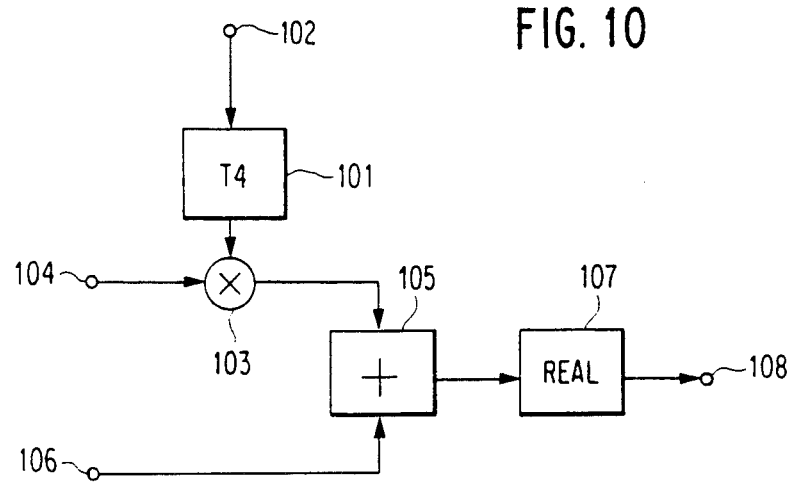
FIG. 10 is a block diagram view illustrating a branch metric composing circuit used in FIG. 6.

Referring to FIG. 10, an example of the branch metric combiner 76 comprises a register 101 for holding T4 supplied from the state transition controller 73 through a terminal 102, a multiplier 103 for multiplying T4 in the register 101 by the filter output z(k) from the matched filter 74 supplied through a terminal 104, and adder 105 for adding the multiplied signal from the multiplier 103 and the branch metric fixed component b(T0, T1, T2, T3, T4) from the branch metric fixed component arithmetic circuit 75 through a terminal 106 and a real component deriving circuit 107 for deriving a real component from the resultant added signal from the adder 105. The real component deriving circuit 107 delivers the derived real component as the branch metric signal B(T0, T1, T2, T3, T4) to the Viterbi processor 72 through a terminal 108.

The calculation by the multiplier 103 and the adder 105 and operation of the real component deriving circuit 107 are represented by the following the equation:

$$B(T0, T1, T2, T3, T4) = \text{Real} \left[ |T4 \times z(k)| + b(T0, T1, T2, T3, T4) \right] \quad (4).$$

Figure 11:
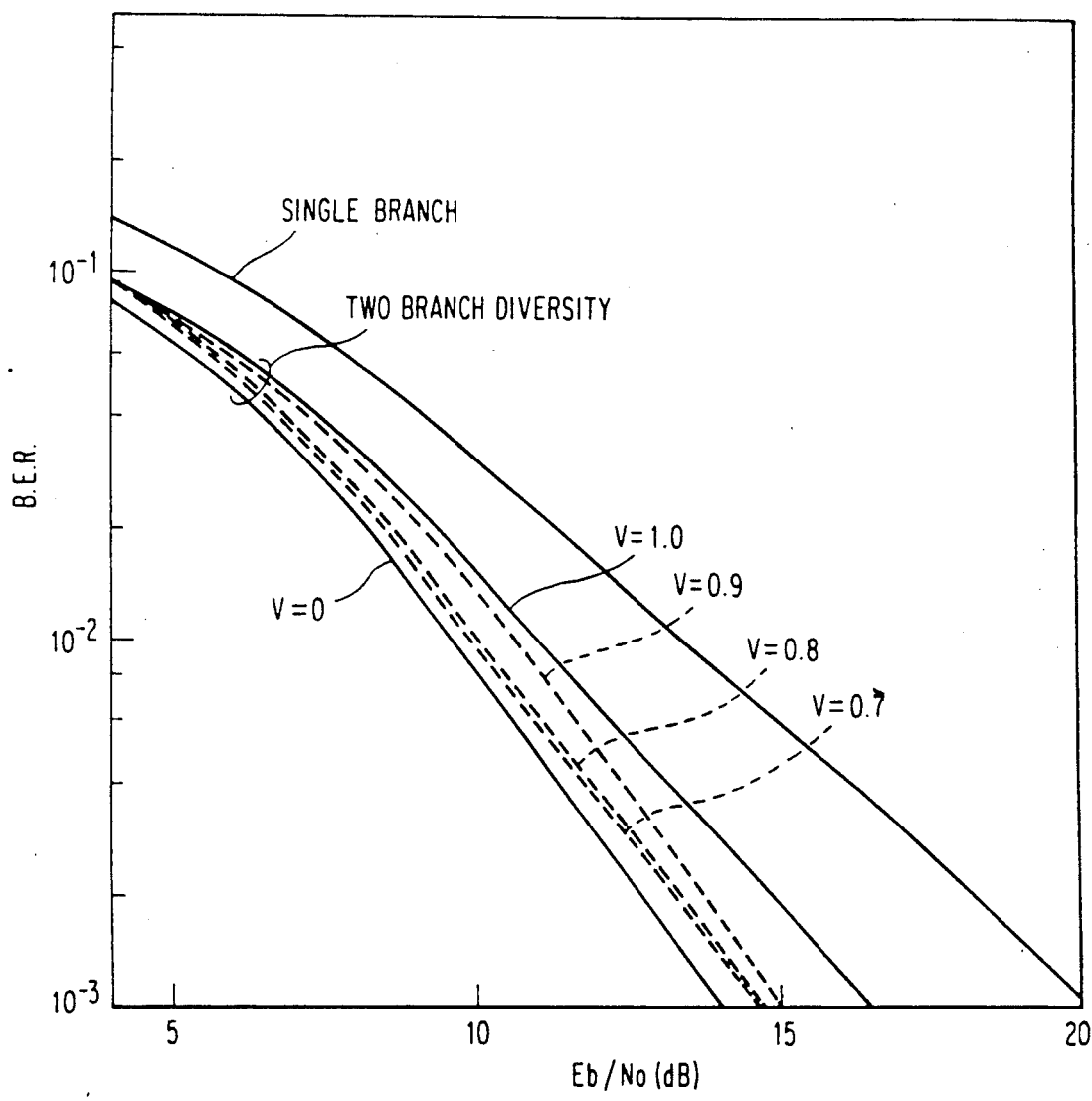
FIG. 11 is a view illustrating a simulated performance of the diversity receiving system for a propagation path model.

The diversity system shown in FIG. 1 was simulated for a propagation path model (I) which comprises a direct wave and a delayed wave (with 3T delay) caused by any reflection. The simulated result is shown in FIG. 11. The figure shows curves of the bit error rate (B.E.R.) in response to the signal to noise ratio (Eb/No). The curves are measured for the single branch and various values of the threshold V.

Figure 12:
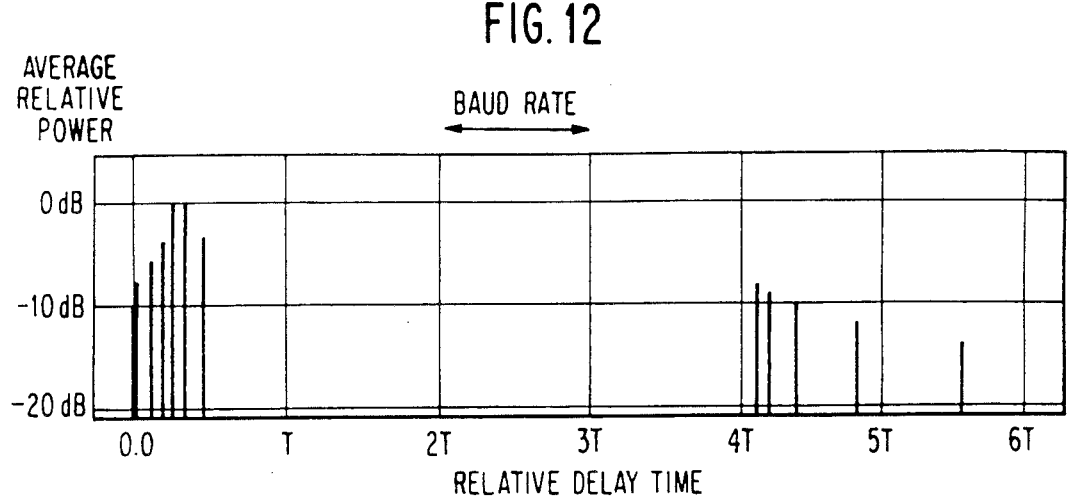
FIG. 12 is a view illustrating another model of the propagation path.

Similar simulation was performed for another propagation path model (II) which has a direct wave and 11 delayed waves as shown in FIG. 12. The resultant bit error rate curves are shown in FIG. 13.

Figure 13:
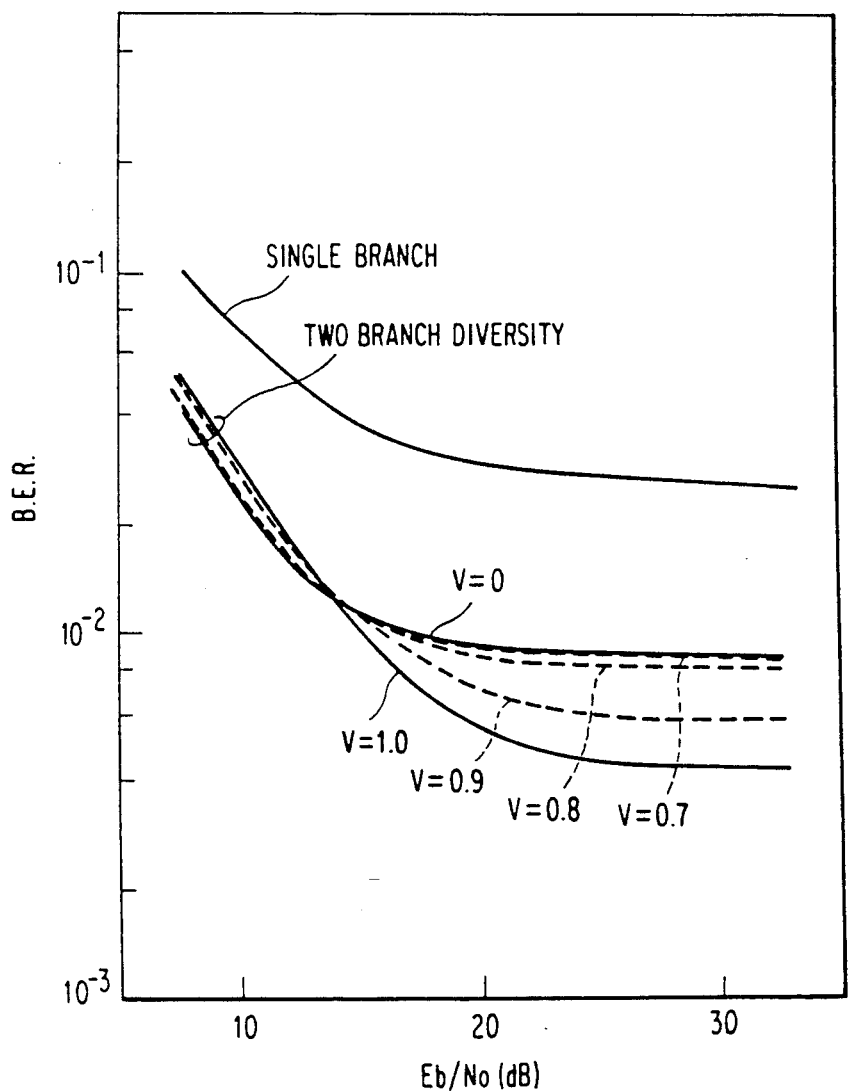
FIG. 13 is a view illustrating a simulated performance of the diversity receiving system for the propagation path model shown in FIG. 12.

It is understood from FIGS. 11 and 13 that the reception performance is improved for the model I but is degraded for the model II when V is selected a small value.

However, the reception performance is improved by a suitable value for the threshold V.

The shown embodiment comprises two receiving branches but can be provided with three or more receiving branches which are commonly connected to the first and the second switches and the branch selector.

What is claimed is:

1. A diversity receiving system for use in reception of a radio signal transmitted through a multipath from a transmitter in digital radio communication system, the radio signal carrying a data signal and a training signal, which comprising:
   equalizing means for equalizing an input signal to produce an equalized signal;
   a plurality of receiving branches, each of said receiving branches comprising:
   receiving means for receiving an incoming signal representative of said radio signal to produce a digital reception signal, said digital reception signal comprising a reception data signal and a reception training signal representative of said data signal and said training signal, respectively;

holding means coupled to said receiving means for holding said digital reception signal;

estimating means coupled to said holding means for estimating a transmission property of said multipath from said reception training signal to produce an estimated transmission property; and classifying means coupled to said estimating means for classifying said estimated transmission property into components significant to said equalizing means as significant components and the remaining components as insignificant components;

branch selecting means coupled to said classifying means in each of said receiving branches for calculating a first and a second power ($\alpha$ and $\beta$) of said significant components and said insignificant components, respectively, a first ratio ($\alpha/\beta$) of said first and said second powers, a sum ($\alpha+\beta$) of said first and said second powers, and a second ratio ($\alpha/(\alpha+\beta)$) of said first power and said sum for each of said receiving branches, said branch selecting means selecting one of said receiving branches as a selected branch in response to said first ratio, said second ratio, and said sum in connection with each of said receiving branches, said branch selecting means producing a selection signal representative of said selected branch;

first switch means coupled to said holding means in each of said receiving branch, said equalizing means, and said branch selecting means responsive to said selection signal for switching to connect said holding means in said selected branch as a selected holding means with said equalizing means to deliver said reception data signal in said selected holding means to said equalizing means as said input signal; and second switch means coupled to said classifying means in each of said receiving branch, said equalizing means, and said branch selecting means responsive to said selection signal for switching to connect said classifying means in said selected branch as a selected classifying means with said equalizing means to deliver said significant components in said selected classifying means to said equalizing means, said equalizing means equalizing said input signal by said significant components to produce said equalized signal as a resultant signal of said diversity receiving system.

2. A diversity receiving system as claimed in claim 1, wherein said branch selecting means compares said second ratio for each of said receiving branches with a preset reference value, and compares said first ratio for each of said receiving branches with each other when said second ratio for each of said receiving branches is not larger than said reference value, said branch selecting means selecting, as said selected branch, a specific one of said receiving branches which provides the largest one of said first ratio for each of said receiving branches.

3. A diversity receiving system as claimed in claim 2, wherein said branch selecting means compares said sum for each of said receiving branches with each other when said second ratio for any one of said receiving branches is larger than said reference value, said branch selecting means selecting, as said selected branch, a particular one of said receiving branches which provides the largest one of said sum for each of said receiving branches.

4. A diversity receiving system as claimed in claim 1, said training signal comprising a symbol sequence of a predetermined first number of symbols, wherein said estimating means comprises:

shift register means of a predetermined second number of stages coupled to said holding means for shifting said reception training signal from said holding means to produce a set of said predetermined second number of delayed symbol signals;

register means coupled to said holding means for holding said predetermined second number of symbols at a middle portion of said reception training signal as a held symbols;

multipliers coupled to said shift register means and said register means for multiplying said delayed symbol signals and said held symbols, respectively, to produce multiplied signals; and an adder coupled to said multipliers for adding said multiplied signals to produce an added signal as said transmission property.

5. A diversity receiving system as claimed in claim 1, wherein said equalizing means comprises:

state transition control means for producing all of possible state transitions as a state transition signal;

branch metric arithmetic means coupled to said first and said second switch means and said state transition control means responsive to said state transition signal for calculating branch metric for a desired one of said all of possible state transitions from said input signal supplied through said first switch means and said significant components from said classifying means of said selected branch through said second switch; and Viterbi processing means coupled to said state transition control means and said branch metric arithmetic means responsive to said state transition signal for processing said branch metric according to a Viterbi algorithm to produce a processed signal as said resultant signal.

6. A diversity receiving system as claimed in claim 5, wherein said branch metric arithmetic means comprises:

a matched filter coupled to said first switch and said second switch means for processing said input signal according to said significant components to produce a filtered signal;

branch metric fixed component arithmetic means coupled to said second switch means and said state transition control means responsive to said significant components and said state transition signal for calculating a fixed component of said branch metric; and branch metric combining means coupled to said matched filter, branch metric fixed component arithmetic means, and said state transition control means for combining said filtered signal, said fixed component of said branch metric, and said state transition signal to produce said branch metric.

7. A diversity receiving system as claimed in claim 6, wherein said matched filter is a transversal filter having tap gains determined by said significant components.

8. A diversity receiving system as claimed in claim 6, wherein said branch metric fixed component arithmetic means comprises:

arithmetic means coupled to said second switch means for calculating real components from said significant components and conjugate complex components of said significant components;

first register means coupled to said arithmetic means for temporarily holding said real components;

second register means coupled to said state transition control means for temporarilly holding said state transition signal;

first multipliers coupled to said first and said second register means for multiplying said real components by said state transition signal to produce first multiplied signals;

an adder coupled to said first multipliers for adding said first multiplied signals to produce an added signal;

a second multiplier coupled to said adder and a third register means for multiplying said added signal by one of said state transition signal to produce a second multiplied signal as said fixed component of said branch metric.

9. A diversity receiving system as claimed in claim 6, wherein said branch metric combining means comprises:

register means coupled to said state transition control means for temporarily holding said state transition signal;

a multiplier coupled to said matched filter means and said register means for multiplying said filtered signal by said state transition signal to produce a multiplied signal;

an adder coupled to said branch metric fixed component arithmetic means and said multiplier for adding said fixed component of said branch metric and said multiplied signal to produce an added signal; and real portion deriving means coupled to said adder for deriving a real portion from said added signal to produce a real portion signal as said branch metric.

* * * * *

UNITED STATES PATENT AND TRADEMARK OFFICE
CERTIFICATE OF CORRECTION

PATENT NO. : 5,065,411

DATED : November 12, 1991

INVENTOR(S) : Hiroyasu Muto

It is certified that error appears in the above-identified patent and that said Letters Patent is hereby corrected as shown below:

Col. 2, line 2, delete "insignificant" and insert --significant--.

Signed and Sealed this

Twenty-fifth Day of May, 1993

Attest:

MICHAEL K. KIRK

*Attesting Officer*  Acting Commissioner of Patents and Trademarks